(12) United States Patent
Edgerton

(10) Patent No.: US 6,641,696 B1
(45) Date of Patent: Nov. 4, 2003

(54) METHOD AND APPARATUS FOR LAMINATING CERAMIC TILE

(76) Inventor: David A. Edgerton, 4850 NW. 52nd, Des Moines, IA (US) 50310

( * ) Notice: Subject to any disclaimer, the term of this patent is extended or adjusted under 35 U.S.C. 154(b) by 243 days.

(21) Appl. No.: 09/614,100

(22) Filed: Jul. 11, 2000

(51) Int. Cl.$^7$ .......................... B32B 7/10; B32B 23/06; B32B 31/20
(52) U.S. Cl. ................. 156/277; 156/306.6; 156/307.1; 156/307.7; 428/325; 428/326; 428/327
(58) Field of Search .......................... 156/272.2, 275.7, 156/289, 277, 71, 306.6, 307.1, 307.7; 428/46, 47, 48, 50, 325, 326, 327

(56) References Cited

U.S. PATENT DOCUMENTS

| | | | |
|---|---|---|---|
| 3,730,828 A | * | 5/1973 | Meiser ..................... 156/307.5 |
| 3,946,137 A | * | 3/1976 | Power et al. ............... 428/452 |
| 4,092,198 A | | 5/1978 | Scher et al. |
| 4,169,907 A | | 10/1979 | Barker et al. |
| 4,311,748 A | | 1/1982 | Casey et al. |
| 4,318,952 A | | 3/1982 | Barker et al. |
| 4,322,468 A | | 3/1982 | Raghava |
| 4,339,489 A | | 7/1982 | Barker et al. |
| 4,393,108 A | | 7/1983 | Barker et al. |
| RE31,373 E | | 9/1983 | Ungar et al. |
| 4,410,595 A | | 10/1983 | Matsumoto et al. |
| 4,427,732 A | * | 1/1984 | Gray et al. ................. 156/235 |
| 4,567,087 A | | 1/1986 | O'Dell et al. |
| 4,581,255 A | | 4/1986 | Coggan et al. |
| RE32,152 E | | 5/1986 | Scher et al. |
| 4,713,284 A | | 12/1987 | Hasegawa et al. |
| 4,832,995 A | | 5/1989 | McLauchlin |
| 4,929,295 A | | 5/1990 | Kohno et al. |
| 4,939,010 A | | 7/1990 | Goossens |
| 5,034,272 A | | 7/1991 | Lindgren et al. |
| 5,073,424 A | | 12/1991 | Dressler |
| 5,234,519 A | * | 8/1993 | Talbot et al. ............... 156/212 |

(List continued on next page.)

FOREIGN PATENT DOCUMENTS

| | | |
|---|---|---|
| EP | 1 125 971 A1 | 3/2000 |
| FR | 2 734 203 A1 | 5/1995 |

OTHER PUBLICATIONS

COPY—2 page brochure entitled Experience texture in decorative laminate design—by sappi warren.

(List continued on next page.)

Primary Examiner—Richard Crispino
Assistant Examiner—Cheryl N. Hawkins
(74) Attorney, Agent, or Firm—Sturm & Fix LLP

(57) ABSTRACT

A method of laminating a graphic sheet of material onto a substrate material, including the steps of positioning a substrate material, having a top and sides, into a desired position, disposing (a) at least one sheet of thermo-setting adhesive on the top of the substrate material, disposing (b) at least one opaque white melamine sheet on the at least one adhesive sheet, disposing the (c) graphic sheet of material on the at least one opaque white melamine sheet, disposing a (d) at least one clear sheet of melamine on the graphic sheet of material, disposing a (e) at least one release paper sheet on the at least one clear sheet of melamine, applying heat to the sheets a, b, c, d and e, and applying pressure to force said sheets a, b, c, d and e against the substrate to thereby cause bonding of said sheets a, b, c and d together and to the substrate. A preferred product produced by the method is formed with a ceramic tile as the substrate and a printed paper sheet as the graphic sheet of material.

21 Claims, 11 Drawing Sheets

U.S. PATENT DOCUMENTS

| | | | |
|---|---|---|---|
| 5,395,690 A | * | 3/1995 | Kawahata et al. ........ 427/207.1 |
| 5,443,628 A | | 8/1995 | Loria et al. |
| 5,507,896 A | | 4/1996 | Yoshimura et al. |
| 5,627,231 A | | 5/1997 | Shalov et al. |
| 5,702,565 A | | 12/1997 | Wu et al. |
| 5,702,806 A | | 12/1997 | O'Dell et al. |
| 5,744,220 A | | 4/1998 | Ringö |
| 5,804,618 A | | 9/1998 | Mafoti et al. |
| 5,807,608 A | | 9/1998 | O'Dell et al. |
| 5,830,548 A | | 11/1998 | Andersen et al. |
| 5,908,527 A | | 6/1999 | Abrams |
| 5,928,777 A | | 7/1999 | Cox et al. |
| 5,997,625 A | | 12/1999 | Londo et al. |
| 6,009,789 A | | 1/2000 | Lyons |
| 6,042,667 A | | 3/2000 | Adachi et al. |
| 6,093,473 A | * | 7/2000 | Min, III ...................... 428/147 |

OTHER PUBLICATIONS

COPY—1 page entitled Introducing Bright Crystal for laminate surface design—by sappi warren.

COPY—5 page brochure entitled High Pressure Laminating (HPL) Ultracast & ETL—Panel Structure Release Papers For HPL—by Warren—date on last page is 07–96.

COPY—4 page brochure entitled Continuous Laminating Ultracast & ETL—Panel Structure Release Papers for Continuous Laminating—by Warren– date on last page is 07–96.

COPY—3 sheets entitled Introducing three new finishes for laminate design by sappi warren.

COPY—2 sheets entitled Introducing Suede for laminate surface design—by sappi warren.

COPY—2 sheets entitled New Ceramic finish by sappi warren.

COPY—1 sheet entitled New Wood Grain finishes by sappi warren.

COPY—3 pages of brochure entitled Image Maker 994 Combo Press—by Geo Knight & Co.

COPY—2 pages of brochure entitled Melamine Overlay—by DYNO.

Copy—6 Page brochure entitled Permanent Product Data—Scotch–Weld Brand Bonding Film by 3M.

COPY—12 page brochure entitled GBC Docuseal—Operating Instructions by GBC of Northbrook, IL.

* cited by examiner

METHOD AND APPARATUS FOR LAMINATING CERAMIC TILE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Field of the Invention

This invention relates generally to a method and apparatus for laminating a graphic sheet of material onto a substrate material and more particularly to a tile substrate.

Ceramic tile, in one format or another, has been used by man as building material or decorative art form almost from the time he walked erect. With the beginning of the second millennium, there exists a splendid selection of tile products manufactured at the rate of millions of square feet per month; this, in contrast to the lone artisan who carefully creates and hand paints each tile independently. The most ubiquitous tile in use today is the standard glazed tile that is installed throughout bathrooms and kitchens around the world. These tiles are available in a variety of colors, sizes and modeled surfaces. This type of tile is inexpensive and utilitarian in design and function.

The tiles may differ slightly in overall dimensions from manufacturer to manufacturer. Typically, these tiles are available in a multitude of colors and patterned designs. Some producers of tile also offer special orders, but this results in high costs and long waiting periods. The most common methods of manufacture of these tiles are: 1) applying a single color glaze to the tile surface, 2) silk-screening a multi-color design to the tile, 3) using specially printed "glass decals". All of the ceramic tile finishes mentioned above are durable, cost-effective and created for the mass market. A problem is that to be cost-effective, they must be mass produced, whereas there is a need for a low-cost custom produced tile.

A recent development is sublimated tile. Sublimation is whereby a special ink is used in an ink jet printer and an image is printed onto a transfer paper. A tile specifically prepared for this process is used. The tile is coated with a film of polyester. The transfer paper is registered to the tile and taped in place. The tile is then placed in a heated press for a specific period of time. The combination of heat, pressure and time results in the image being transferred into the surface of the specially prepared tile. Any image that can be scanned or created with a computer graphics program, then printed to the transfer paper, can be implemented onto the surface of the tile. It produces a superb image, but lacks durability. Any sharp instrument can easily scrape and damage the surface, rendering it useless for any surface that needs to be cleaned or experience high traffic. The tile is also limited in finishes. It is currently only available in matte, semigloss, gloss and fleck. Consequently, there is a need for a custom produced tile that is durable enough to be used where more durable custom glazed tiles are used.

BRIEF SUMMARY OF THE INVENTION

The present invention relates to a method of laminating a graphic sheet of material onto a substrate material including the steps of positioning a substrate material, having a top and sides, into a desired position, disposing (a) at least one sheet of thermo-setting adhesive on the top of the substrate material, disposing (b) at least one opaque white melamine sheet on the at least one adhesive sheet, disposing the (c) graphic sheet of material on the at least one opaque white melamine sheet, disposing a (d) at least one clear sheet of melamine on the graphic sheet of material, disposing a (e) at least one release paper sheet on the at -least one clear sheet of melamine, applying heat to the sheets a, b, c, d and e; and applying pressure to force said sheets a, b, c, d and e against the substrate to thereby cause bonding of said sheets a, b, c and d together and to the substrate. The present invention also relates to a product produced by the method, a preferred product being one formed with a ceramic tile as the substrate.

An object of the present invention is to provide an improved lamination process and product.

Another object is to eliminate several steps in creating a melamine saturated decor paper separate to and in advance of creating an ordinary laminated product.

A further object is to create custom images for each individual tile for the cost of an ink jet print, something large decor paper manufacturers cannot do.

A still further object is to produce a laminated tile for less than a sublimated tile and provide a long-lived and durable construction grade finish with unlimited textures, something sublimated tile cannot provide.

A still further object is to be able to manufacture ceramic tile with the same color, pattern, image and texture and any combination thereof, to match and complement any laminated construction product such as Formica®, Wilsonart® and Nevamar® countertops, panels and flooring materials.

Another object is to use an ordinary ink jet printer, rather than expensive sublimation inks.

Another object is to produce custom printed tile more quickly than sublimated tile.

A still further object is to allow architects, interior designers and homeowners to directly participate in the design of their tile by creating their complete project on their own computer and deliver it via storage disc or the Internet, allowing the tile laminator to go directly into production within minutes.

A still further object is to make custom ceramic, custom-grade tile faster and cheaper.

Another object is to allow for easy replacement of broken tile damaged during installation, or after its original installation, since all artwork can be stored on disks and can be readily accessible.

A still further object is to provide a durable laminated tile which will withstand multiple cleanings over a long period of time.

A still further object is to provide a tile which can be used on any surface, even floors.

Other objects, advantages, and novel features of the present invention will become apparent from the following detailed description of the invention when considered in conjunction with the accompanying drawings.

DETAILED DESCRIPTION OF THE INVENTION

Figure 1:
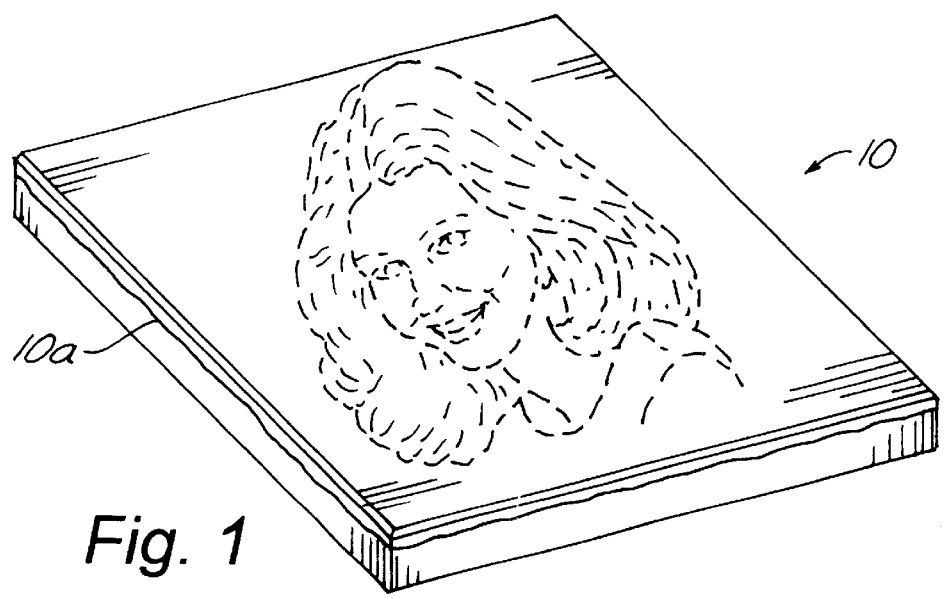
FIG. 1 is a perspective view of a completed ceramic tile constructed in accordance with the present invention and having a printed image of a young woman formed therein.

Referring now to the drawings, wherein like reference numerals designate identical or corresponding parts throughout the several views, FIG. 1 shows a laminated tile (10) constructed in accordance with the present invention.

Practically any tile can be used for the laminating process of this invention with some exceptions. Glazed or unglazed (bisque) tile (11) can be used for laminating. A minimum of surface undulation can be tolerated. Testing a new tile will quickly determine whether or not a tile is a candidate for the process. Deep textures or reliefs cannot be used. The ideal tile has a smooth face that incorporates a slight sloping return at the perimeter. This "return" can be either a flat bevel or exaggerated radius.

After the tile (11) has been deemed acceptable, the surface must be inspected and prepared prior to use. Generally, a few tools will suffice for this operation depending upon the number of irregularities on the surface or sides. A combination of electric bench-top 1" vertical belt and 8" disc sander, using medium grit paper, is preferred. Also preferred is an orbital palm sander with medium grit paper and a flat file. A tile is selected and all surfaces are inspected for defects and irregularities. If the edges are sharp, all four front edges of the tile must be run through the bench top sander to "ease" the leading edge. This is done by setting either platform on the sanding unit at a 45° angle at each upper peripheral corner. Next, a flat file is used to "knock off" any imperfections in the glaze caused by particulates trapped in the surface prior to firing. After this operation is completed, the tile (11) is held with one hand, the orbital palm sander is grasped with the other. The tile is rotated around while running the orbital sander over the face and "roll over" onto the sides to soften the angles on the bevel that were created when "easing" the edges. This process is repeated on each additional tile.

One of the preferred products used for this process is a thermosetting adhesive such as the 3M #588 Thermosetting Adhesive (12). It is a Synthetic Elastomer 0.006" (0.15 mm) Light Tan Color with Release Treated Paper 0.0035" (0.09 mm) Light Blue Color. This Scotch-Weld® 588 Bonding Film is flexible. 100% solids heat activating dry film adhesive composed of a higher ratio of thermosetting resins than Scotch-Weld® 583 for high internal strength and structural type bonds. The thicker caliper of Scotch-Weld® 588 makes it especially suitable for various splicing and general purpose bonding to irregular and porous surfaces. Both Scotch-Weld®583 and 588 are capable of developing structural type bonds if properly thermoset during heat activation. The thermoset bond provides ultimate heat and chemical resistance for critical applications.

The first and bottom-most layer in the lamination process is the 3M #588 Thermosetting Adhesive (12). This layer comes in direct contact with the face of the ceramic tile (11) when placed into the compression die (21). When constructing the subassembly, the release liner (17) is orientated down and is not removed until just before placing the subassembly into the compression die. During the heated pressing process, the adhesive momentarily liquefies when it reaches its critical temperature. Thus flowing and bonding with the ceramic tile (11) directly below it and cross linking with the opaque white melamine layer (13) directly above it. Spacers (11a), usually one or two on a side, are standard on tiles (11).

A graphic sheet (14) is preferably on Ink Jet Print on White 20 LB Ink Jet Paper.

This is a very important discovery in context to the rest of the invention. The lamination industry uses a product defined as "decor paper" which is constructed of laminates on various surfaces. This "decor paper" is usually a paper stock that has been preprinted by any of several ways, then saturated with melamine in a liquid state. This can be done in one of two ways (although there may be different ways known to others). The paper is fed through a holding tank of the melamine solution or it goes through a printing type application. After the paper is saturated with the resin, it is then brought to a semi-cured state. The paper in this state is known as "decor paper". It is then ready to be included with other layers to complete the finished product.

This prior art decor paper process is done with volume in mind. It would be highly unlikely that any of the mass producers of these decor papers for the laminating industry to run a single sheet of 8½"×11" paper through this entire process, let alone each piece being of a different image. That is the present invention of using an ink jet print generated by a computer to make a graphic sheet (14) instead of a "decor paper". The tiles (10) are produced by the present invention for a niche market of custom imaged tile and individual prints or short runs of the same image. It is cost efficient and can be accomplished in the time it takes the printer to complete the design on the 20 LB white ink jet paper (14). The other critical discovery incorporating the ink jet print as the basis for a graphic sheet instead of the prior art the "decor paper" is that a preferred 20 LB ink jet paper works much better than its heavier weight variations, although other weights are contemplated by this invention. The thinner and less dense paper allows for a high quality print, but even more importantly, it saturates better during the pressing and heating operation allowing for a better cross linking between the opaque white melamine and the fortified clear melamine cap sheet.

Figure 2:
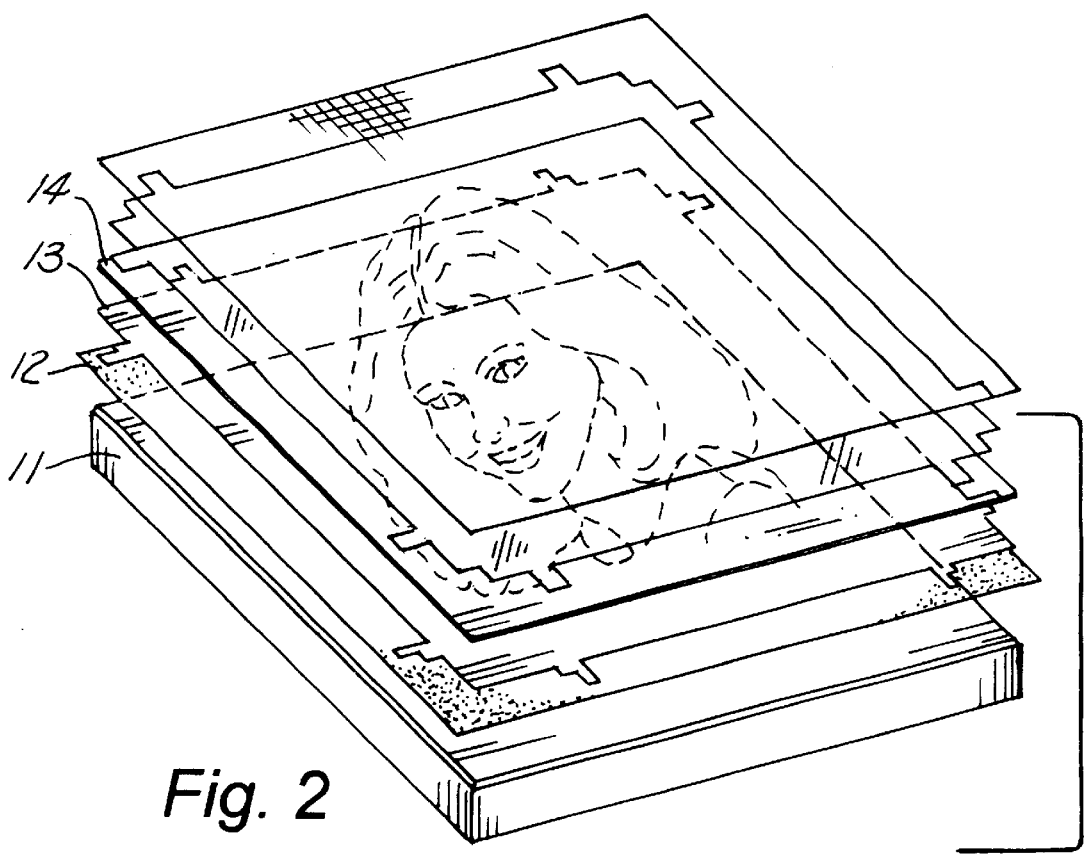
FIG. 2 is an exploded view of the layers utilized in forming the present invention of FIG. 1 including from the bottom up a ceramic tile, an adhesive layer, an opaque white melamine sheet, an ink jet paper having the image of a young woman thereon, a clear melamine cap sheet and a textured release paper which is only used in the process, but does not form part of the final product shown in FIG. 1.

FIG. 1 shows a completed laminated tile (10) according to this invention. FIG. 2 shows the layers which include a tile (11), adhesive sheet (12), opaque white melamine sheet (13), paper ink jet sheet (14) with a graphic image of a young woman thereon. This graphic image could be anything desired, including just a solid color. FIG. 2 also has a clear melamine sheet or cap (15) and a texture release paper (16). The texture can be smooth or any other texture desired.

Figure 10:
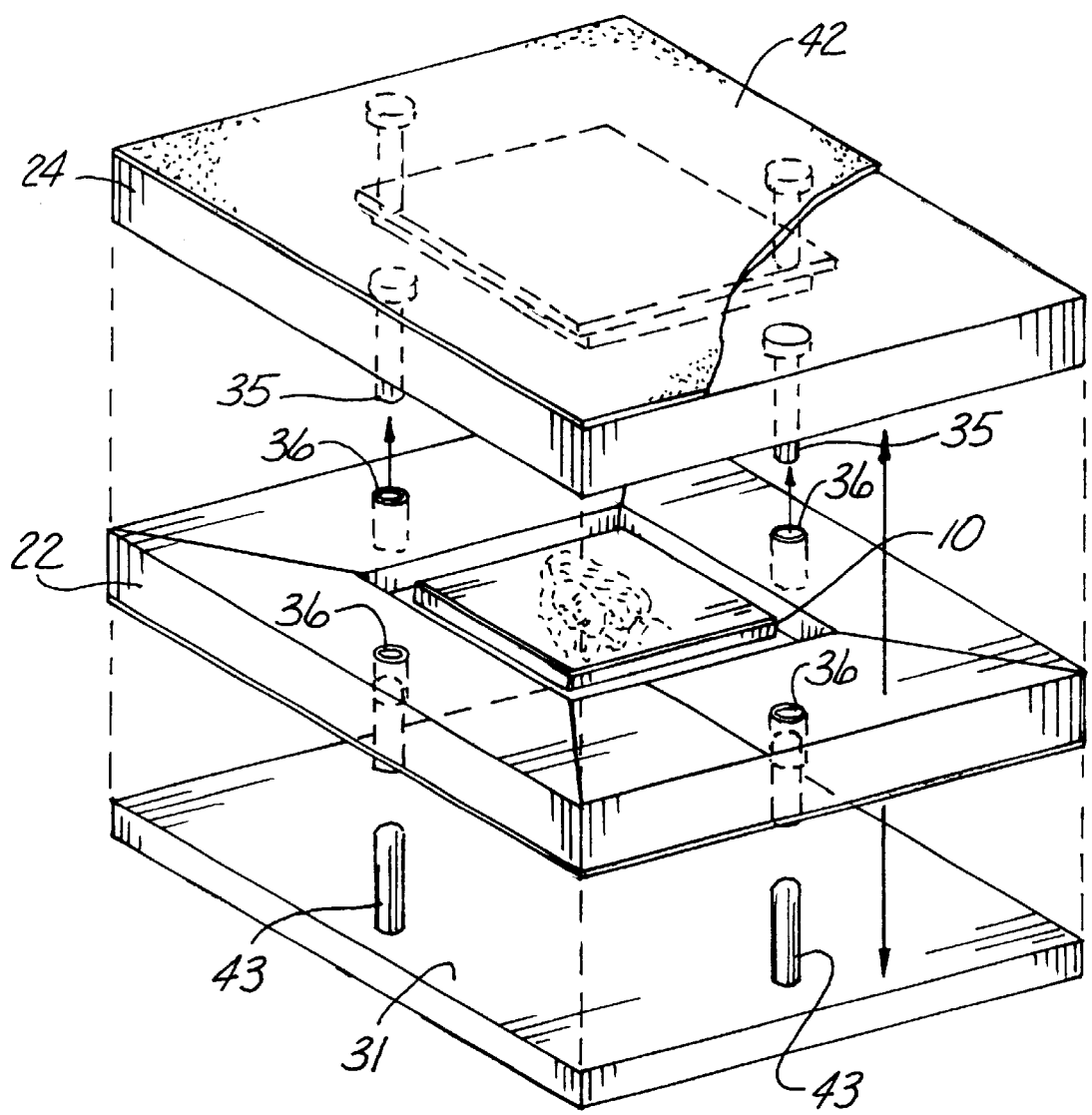
FIG. 10 is an exploded view of the die and super heated top caul plate with alignment pins and openings and the space for the ceramic die cavity, and also showing the release plate with pins for separating the die from the top caul plate.

A compression die (21) is a specially configured mold for completing the laminating process. While other substrates besides tile (11) can be used, the preferred embodiment is for ceramic tile (11). Ceramic tiles may vary in size. Although there are standard sizes, each manufacturer may slightly change the outside dimensions or thicknesses of the tile. This requires a specially designed compression die for each individual tile. The compression die (21) consists of two distinct parts: (1) a base (22) with a modular molding (23) design; (2) a top caul plate (24) with a modular molding design (26) or continuous plate (not shown); and (3) a release plate (31) shown in FIG. 10. The base consists of several unique features. Starting at the bottom most surface: (1) a shim cavity (27) is an area directly below the rubber thermo-conductive layer (28). The shin cavity (27) is used to add or subtract a thickness to adjust the pressure on the tile when in the press. (2) A rubber thermo-conductive layer (28) is primarily for absorbing and distributing uneven forces when in the press (40) shown in FIGS. 7, 8 and 12–16 so that the tile (11) does not break. (3) A tile cavity (29) is the area reserved for placing the ceramic tile (11) into the compression die (40) and registering it in order to hold alignment of the laminations and the top caul plate (24). This is very critical for the registration of the ink jet print onto the surface of the tile (11). (4) A void cavity (32) is an area created around the tile cavity (29) and directly below a receiving shelf (33). This void cavity (29) accepts the tabs of the laminates and the excess top layer of rubber thermo-conductive material (34) when the press is engaged. (5) The receiving shelf (33) is a small ledge that tabs (13a) or (15b) from the laminates layers rest upon when placed into the compression die (40). This receiving shelf (33) is critical in that it registers the laminates to the ceramic tile (11) top face.

The top caul plate (24) is the plate that is placed directly over the base (21) and registered by the appropriate number of alignment pins (35). This action centers the immediate area of contact directly over the laminate layers resting on the receiving shelf (33) and the ceramic tile (11) directly below these layers. This top caul plate (24) comes in direct contact with the heated press platen (41) and is responsible for absorbing the heat and transferring it to and through the rubber thermo-conductive layer (42). From there, the heat is further transferred to the laminate layers and subsequently onto the ceramic tile (11).

The release plate (31) is a plate the same size as the compression die (21) with opposing pins (43) protruding upwards. When the compression die (21) is removed from the press, it is set down on the release plate (31). This action results in the opposing pins (43) going into the bottom of the die (21) and making contact with the top caul plate (24) alignment pins (35). The resulting action pushes the superheated top caul plate (24) up and away from the base (22) in order that it may be easily removed.

Figure 3:
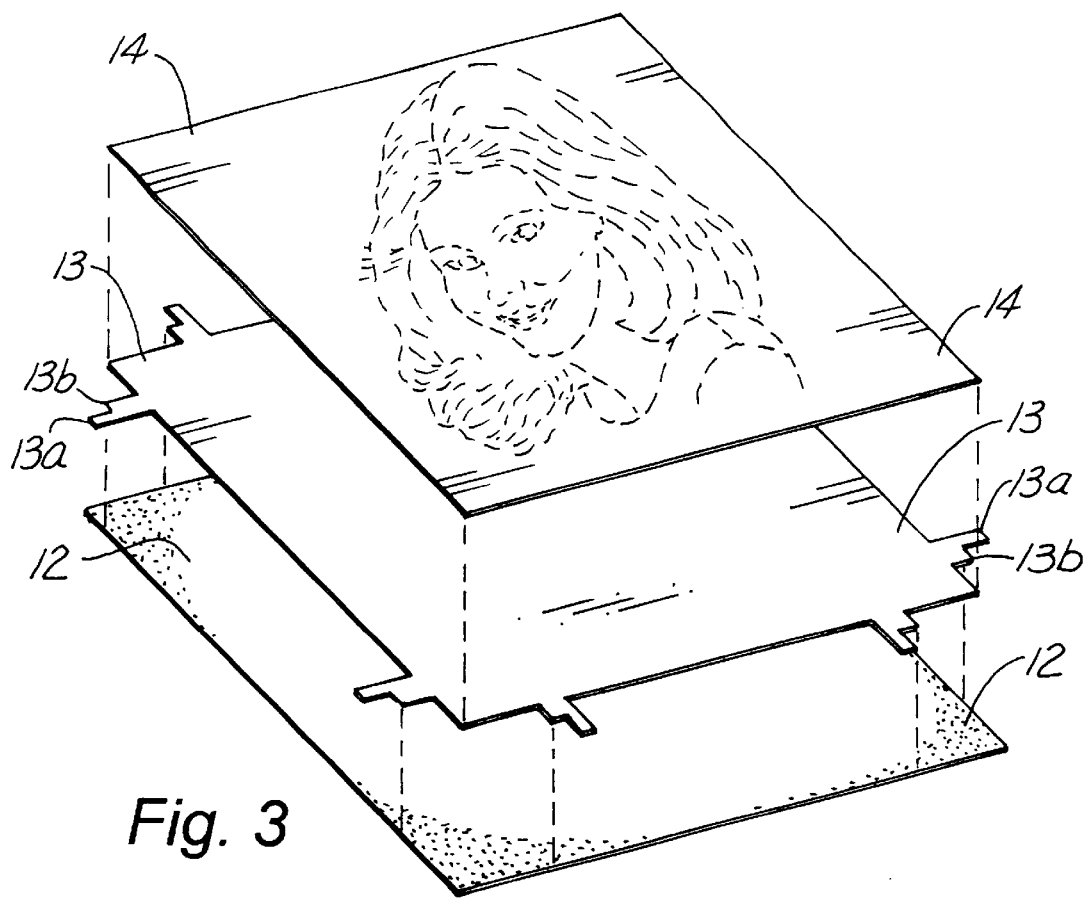
FIG. 3 shows a subassembly of the adhesive sheet, the opaque white melamine sheet and the ink jet paper sheet with the preferred image thereon.
Figure 4:
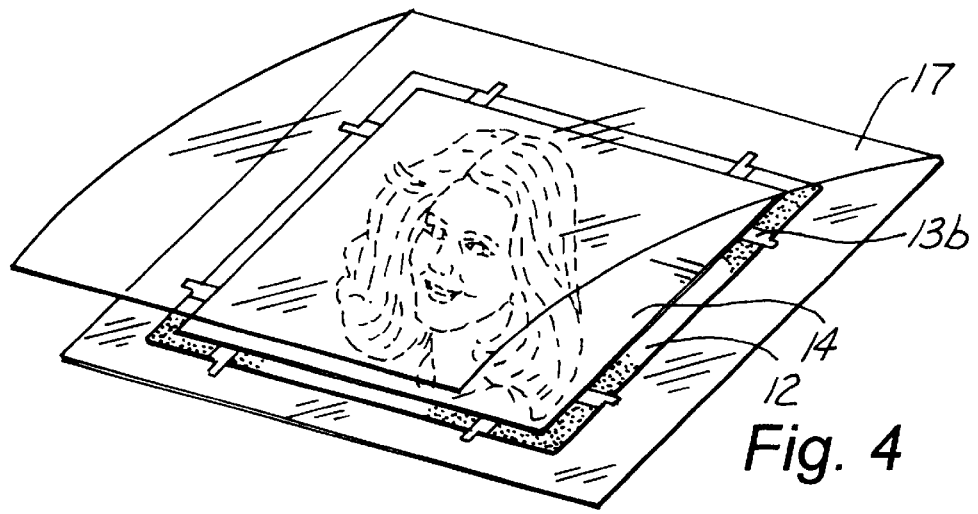
FIG. 4 shows the subassembly shown in FIG. 3 enclosed in a laminating sheave.
Figure 5:
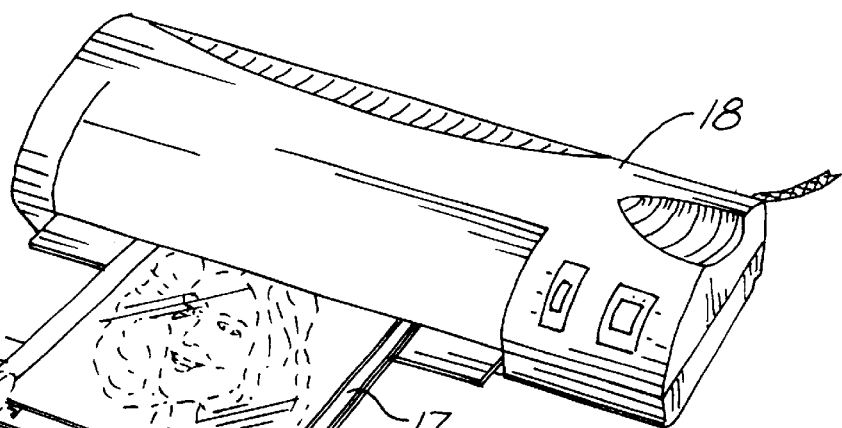
FIG. 5 shows a heat laminating device for bringing the subassembly of FIG. 3 into a "tacky" state so that the three layers of the subassembly can be easily handled using the lamination sheave of FIG. 4.
Figure 6:
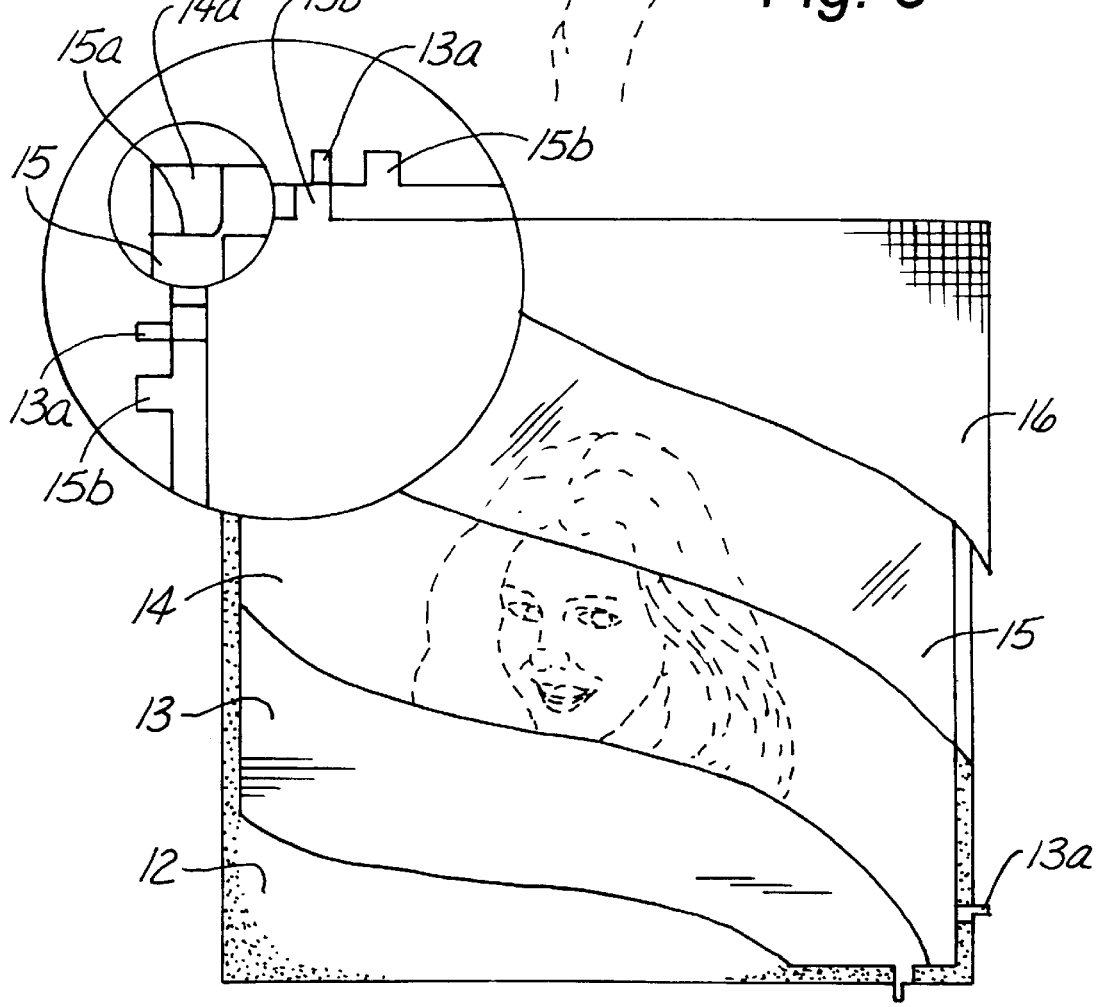
FIG. 6 shows the various layers of FIG. 2 broken away and also shows the various tabs and notches on the layers which are used for alignment purposes.

A Sub-Assembly of Layers is preferred in this laminating process as shown in FIG. 3. Prior to going to press, three layers are combined to create a subassembly. These layers are: (1) The 3M #588 Adhesive Sheet (12), on the bottom. (2) the 117 Gram Opaque White Melamine Sheet (13), in the middle. (3) The 20 LB. Ink Jet Printed paper Sheet (14), on the top. These layers are cut, die-stamped or cut by a laser or the like according to the specifications required by a specific tile. The adhesive layer sheet (12) aligns with the second notch (13b) that occurs on the white melamine layer as seen in FIGS. 3 and 6. The ink jet print sheet (14), having already been cropped to a specific size is then placed on top of the white melamine sheet (13) and aligned with the innermost outlines as shown in dashed lines in FIG. 3. The ink jet print sheet (14) should align perfectly with these outlines. These three layers are then placed in a lamination sheave (17). The sheave (17) consists of an appropriate size of release paper that has been folded over, as shown in FIGS. 4 and 5. The purpose of the sheave (17) is to prevent any sticking of the adhesive (12) and melamine (13), and protect the ink jet printed paper (14) as it passes through laminating rollers in laminator (18).

The sheave (17), with the three layers placed inside the fold, is passed through a heated roll laminator (18). This is done at a low heat level to prevent any curing of the adhesive (12) or melamine (13). This process only serves to bring the materials (12) and (13) to a tacky state so that they will adhere enough to one another so that the component sheets (12, (13) and (14) can then be easily handled. The subassembly shown in FIG. 3 is then placed onto the receiving shelf (33) in the base of the compression die as shown in FIG. 11.

Figure 11:
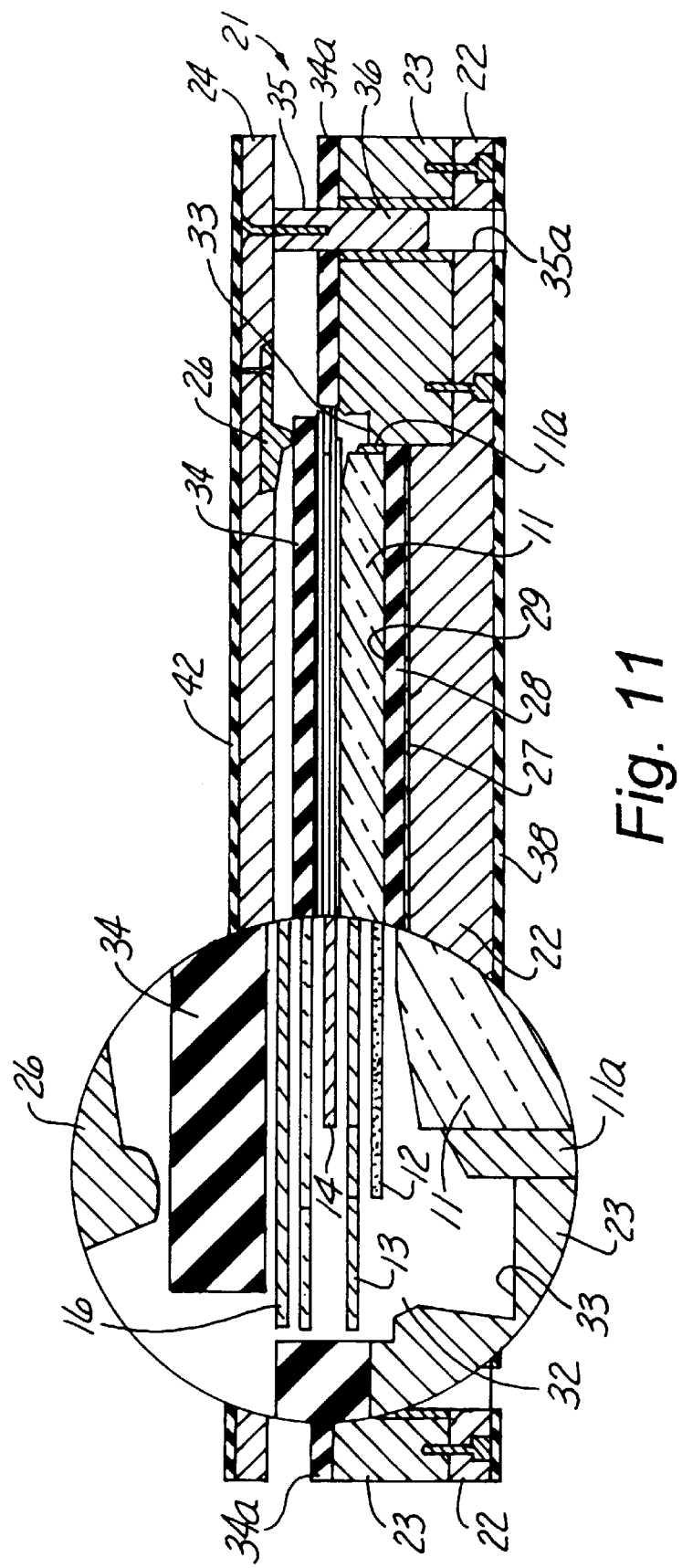
FIG. 11 is a cross sectional view of the die and top caul plate and showing in an enlarged section the various layers of the lamination to be placed on a ceramic tile.
Figure 12:
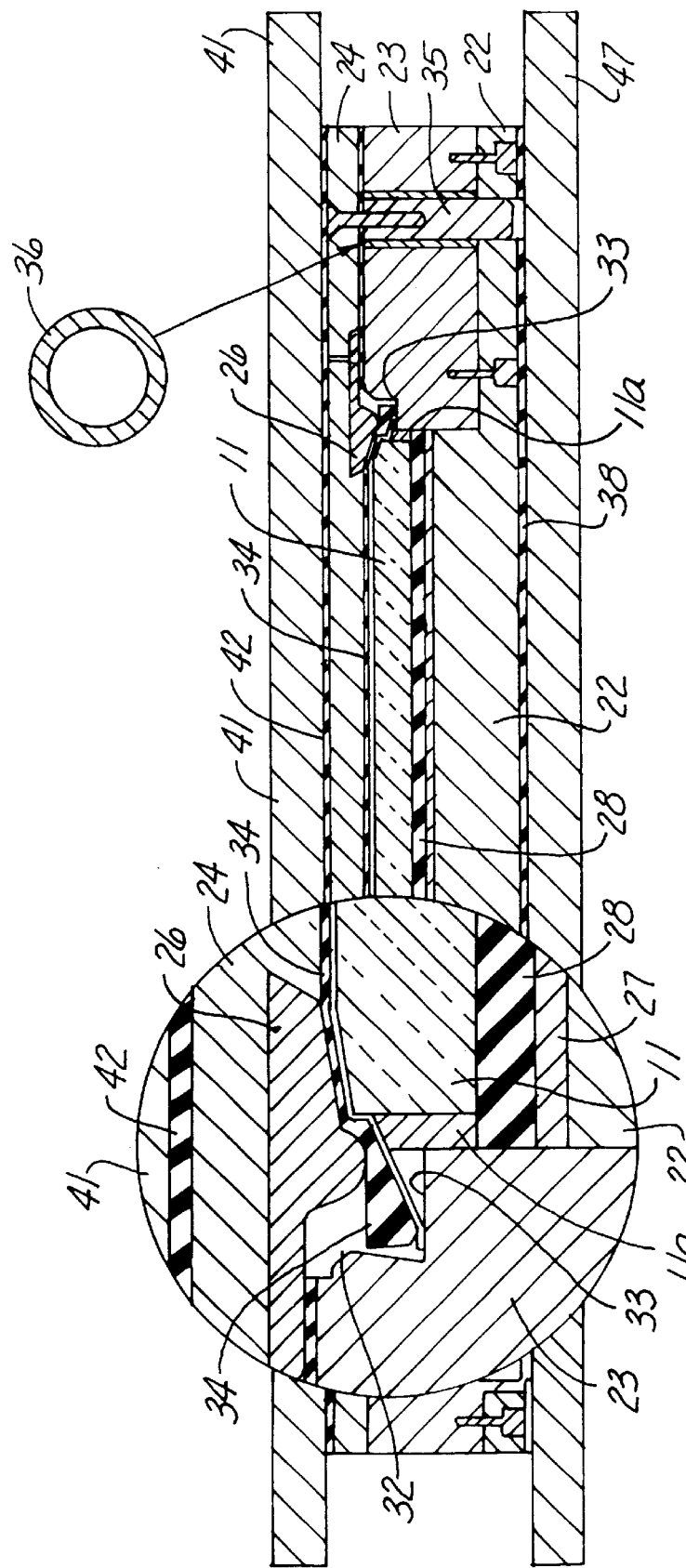
FIG. 12 is a view of the lamination after heat and pressure has been applied from the top caul plate.
Figure 13:
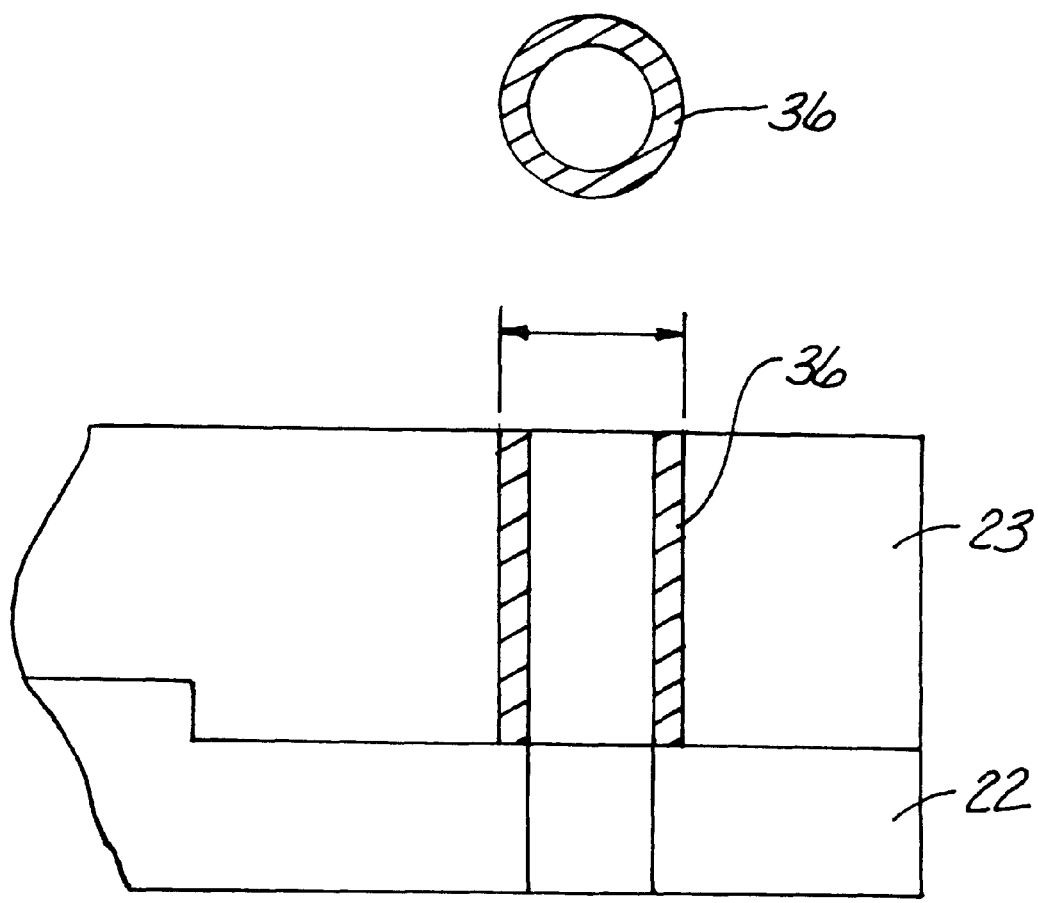
FIG. 13 is an enlarged partial cross sectional view of a bushing which is on a molding of the die molding and base plate.

To load the compression die (21) for pressing, one should (1) select the proper compression die (21) for the tile (11) to be used as shown in FIG. 11; (2) remove the top caul plate (24) from the base (22) and set it aside; (3) insert a single tile that has been properly prepared and cleaned into the ceramic tile cavity (32); (4) place the subassembly of the bottom three sheets (12), (13) and (14) of FIG. 3; (5) place the clear melamine cap sheet (15) (FIG. 11) directly onto the subassembly; (6) place the textured release paper sheet (16) directly onto the clear melamine cap sheet (15); (7) place the rubber thermo-conductive pad (34) directly onto the textured release paper sheet (16); (8) pick up the top caul plate (24) and carefully insert the alignment pins (35) into the receiving hole (35a) for the alignments in the base (22) and carefully lower the top caul plate (24) until it comes to rest under its own weight directly upon the rubber thermoconductive pad (34); and (9) the compression die (21) and its contents are now ready to "go to press".

Figure 7:
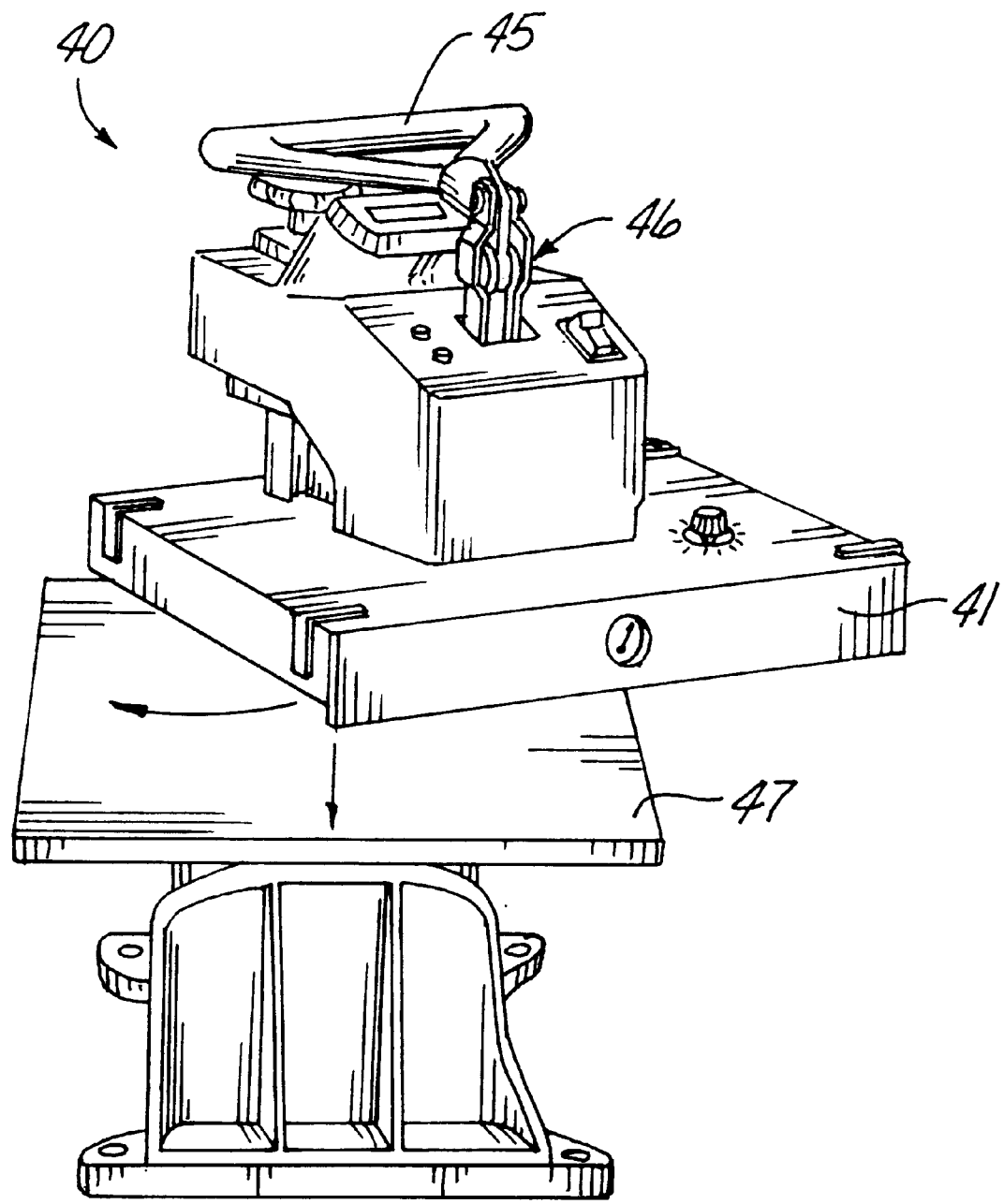
FIG. 7 shows a perspective view of a compression die with a heated press platen.
Figure 8:
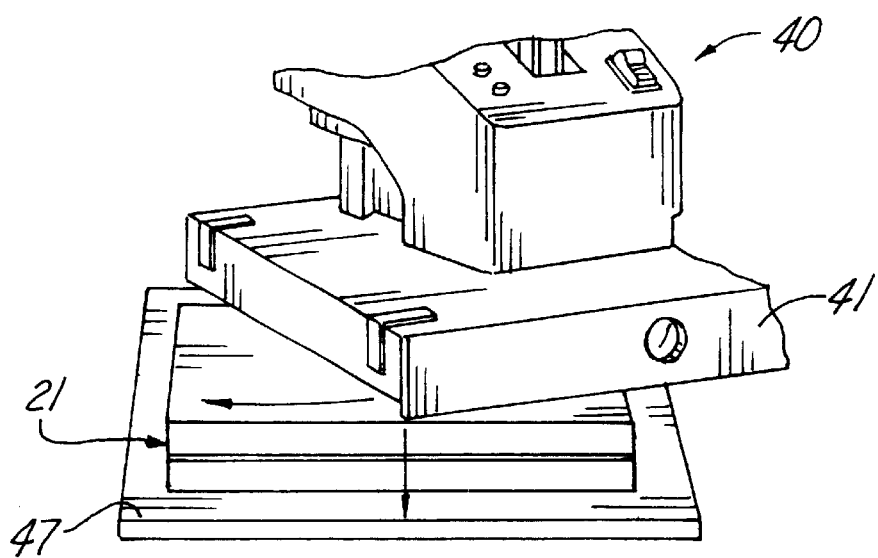
FIG. 8 shows the compression die of FIG. 7 with a die and top caul plate as shown in FIG. 9.
Figure 9:
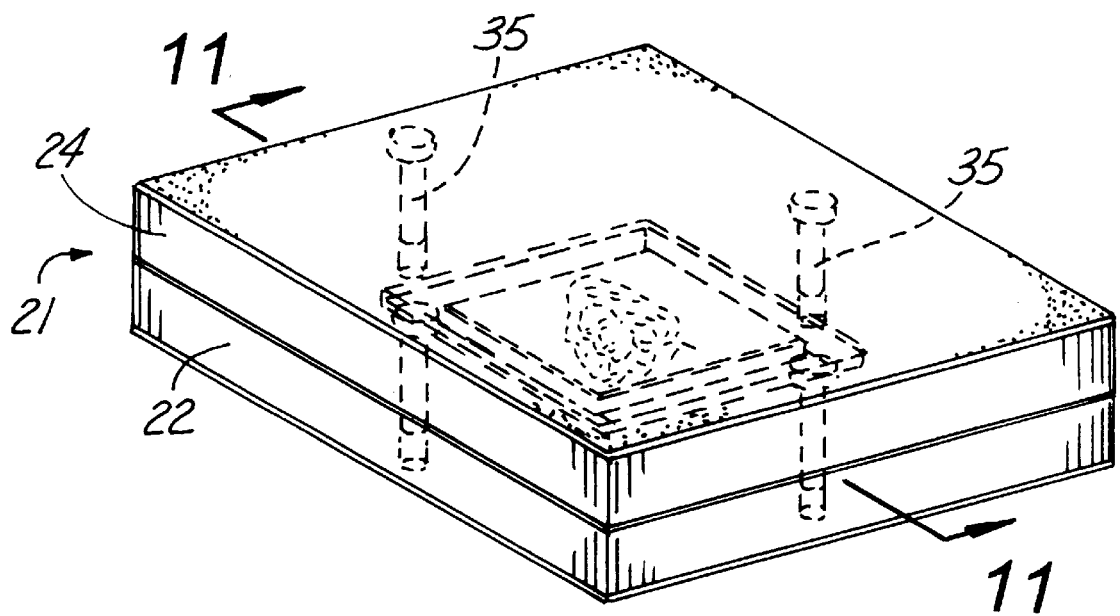
FIG. 9 shows a perspective view of a die and top caul plate used in FIG. 8 and showing in dashed lines the alignment pins and the ceramic tile and various parts thereof in dashed lines.

In order to cure the adhesive (12) and the melamine (13) and (15) layers within the compression die (21), heat and pressure must be exacted upon the compression die (21). When the adhesive (12) and melamine (13) and (15) reach a predetermined critical temperature, as specified by the manufacturer of the melamine and the manufacturer of the thermosetting adhesive, the process is completed. There are several types of presses that can be used to apply the proper amount of heat and pressure, including manual and automated presses: (1) A manual press (40) shown in FIGS. 7 and 8 is a simple flat-bed press in which the upper platen (41) is heated. These units (40) typically have a thermostat control for heat and a count-down timer. The pressure is engaged by closing the press (40) with a handle (45) that pulls over and down and locks into place when the center point in the leverage mechanism (46) is passed. The amount of force that the press (40) exerts can usually be controlled by a screw-type device (not shown) that raises and lowers the upper platen to a specified height. (2) An automated press (not shown) is far easier to use. Like its manual counterpart, it also has an upper heated platen that is controlled with a thermostat and timer. The pressure in the newest presses is created by inflating a Kevlar® air bag. The air pressure is provided by a standard industrial air compressor that is connected to the unit and it can easily be adjusted by a valve. These systems can provide enough pressure to literally crush a ceramic tile. To engage the cycle on an automated press, the compression die (21) is set on the bottom platen and rolled under the top platen and locked into place. The operator then pushes a button and the top platen is forced down onto the compression die by inflating the air bag. A digital clock, which had been set prior to the operation, determines the length of time that the press remains engaged. At the completion of the time cycle, the pressure is released and the operator can then unlock the bottom platen and roll out the compression die. This invention can use any conventional press, be it manual, automatic or semi-automatic.

Figure 14:
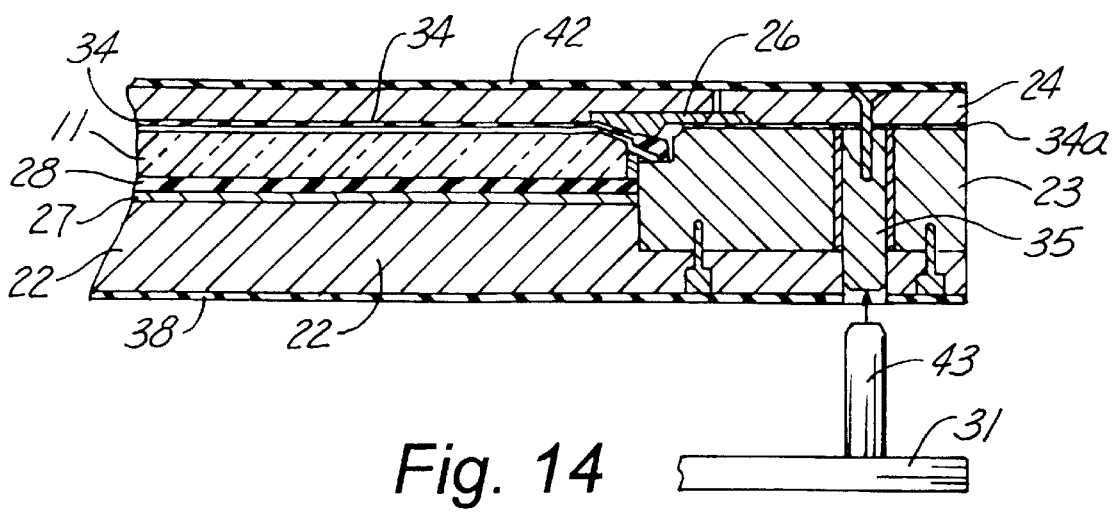
FIG. 14 is a view showing the process similar to FIG. 10 of separating top caul plate from the die after the lamination has occurred.
Figure 15:
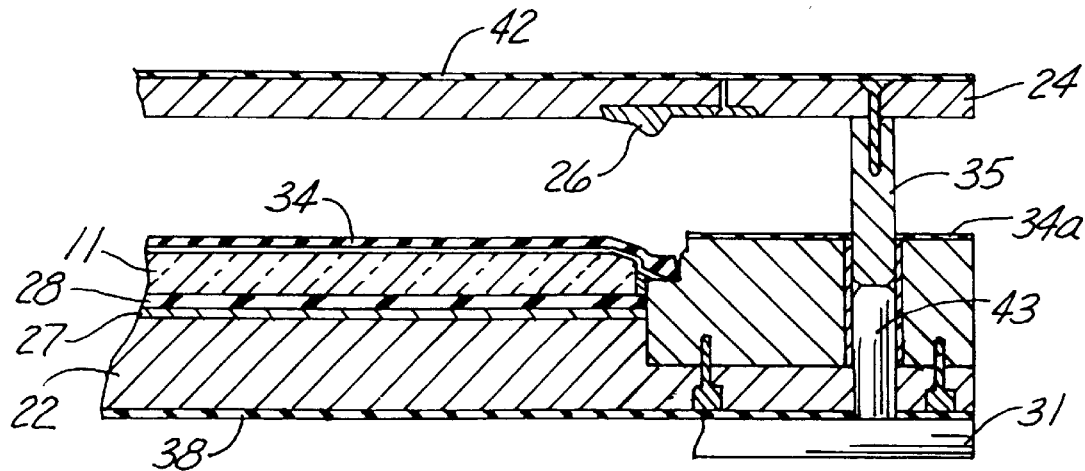
FIG. 15 is a further step in the process after the release plate has pushed the top caul plate away from the die.

Upon completion of the timed heat and pressure cycle, the compression die (21) is removed from the press (40) for extraction of the contents. As shown in FIG. 14, the compression die (21) is set down on a plate (31) that has opposing alignment pins (43) that project up towards the top caul plate (24). When the base (22) is set down on this plate, the pins (43) meet the affixed alignment pins (35) on the top caul plate (24) and the resulting action is the top caul plate (24) is pushed upwards and away from the case as shown in FIG. 15. This makes it easier for the operator to finish removing the heated top caul plate (24) from the base (22) and setting it aside to cool before another pressing is done (FIG. 16).

Figure 16:
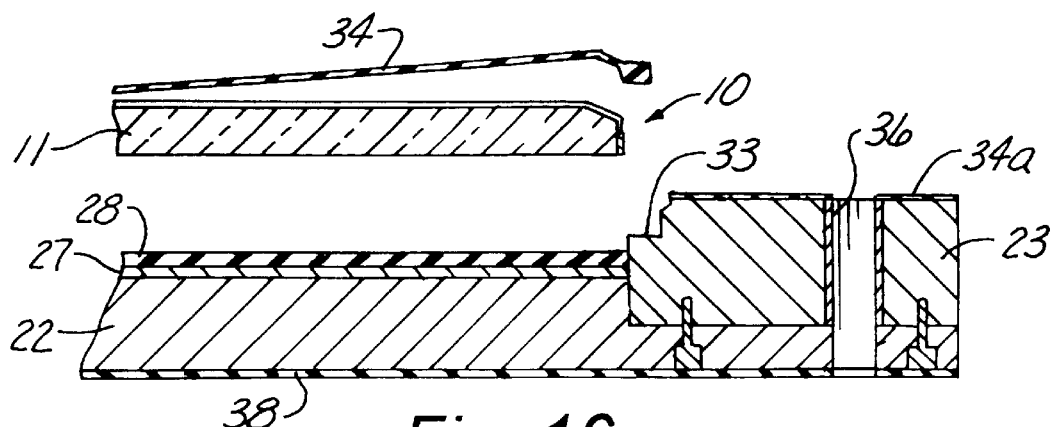
FIG. 16 is a view showing how the tile is removed from the die after the steps shown in FIGS. 14 and 15 have occurred.

As shown partially in FIG. 16, once the inside cavity of the base (29) is exposed, the following order of extraction should take place: (1) Carefully remove the rubber thermoconductive pad (34) from the base and set it aside as shown in FIG. 16; (2) carefully remove the textured release paper (16) from the surface of the laminated tile (10) using an appropriate sized pair of tweezers (not shown). Once this textured release paper (16) has been removed it can be discarded; (3) using a simple vacuum activated tool (not shown), place it onto the top surface of the tile and allow a vacuum to form. Once the vacuum has formed, lift the laminated tile (10) straight up and out of the ceramic tile cavity and set it on an appropriate surface to cool. The vacuum is then shut off to release the tile (10) from the vacuum tool.

Once a tile (10) has set sufficiently long enough to thoroughly cool and assume room temperature; the edges need to be dressed. A 1" vertical belt sander (not shown) with a fine grit of paper will work very well for this purpose. After the tile (10) is inspected, the rough edges are touched to the sanding belt to remove any unwanted burrs and/or defects. This process is repeated until all the sides of the laminated tile are satisfactory and acceptable.

After the laminated tile (10) has been thoroughly inspected and cleaned, a sealant (not shown) is applied at the juncture (10a) (FIG. 1) where the laminate meets the exposed tile surface on all the sides. The purpose for this application of a sealant is to seal any imperfections at the edges of the lamination where it meets the raw ceramic. It further adds to the level of protection against further intrusion of moisture and fungi. A clear resin based adhesive, spar varnish or polyurethane all offer the suggested additional protection, bond well with both surface and clean up easily prior to full air dried cure.

In order to complete this process, a simple device (not shown) to clamp the laminated tile in a perpendicular position and allow it to spin freely will speed up the process and allow the operator to spot any imperfections and repair them before, packaging. Also, having the sides of laminated tile (10) fixed in a horizontal position, allows the sealant to flow and penetrate any crevices much better than if it were applied when the edges of the tile were vertical. In this position, the sealant would tend to run off much quicker. Once the laminated tile is secure in the clamping device, the operator would then apply the sealant using a small foam roller to completely seal all of the exposed edges of the lamination and the sides of the tiles. Once this operation is completed, the operator will wipe any excess from the face of the laminated tile and place the tile on a drying rack to air dry for the recommended amount of time prior to final inspection and packaging.

After the laminated tile (10) has completely air dried, the tile (10) should be. inspected one last time for any imperfections in the laminations, graphics and overall appearance. Any dried sealant should carefully be removed with the appropriate solvent sparingly applied to a cotton cloth. The operator must be careful not to clean too far down and over the leading edge of the tile. Any tiles that have been cleaned in this ;manner should be set aside for a short period of time in order to allow spirits to evaporate from this cleaning procedure. Final wiping of the tile should be completed with 70% isopropyl alcohol. This is an excellent agent for removing any remaining spirits and any oils from the hands of the operator. Usually a light misting from an aerating bottle works well, followed by a wiping with a cotton type cloth. The finished laminated tile (10) is then placed into an appropriate reinforced shipping container (not shown). The tiles are placed in pairs of front to front and slip-sheeted with a paper liner between each tile.

Figure 17:
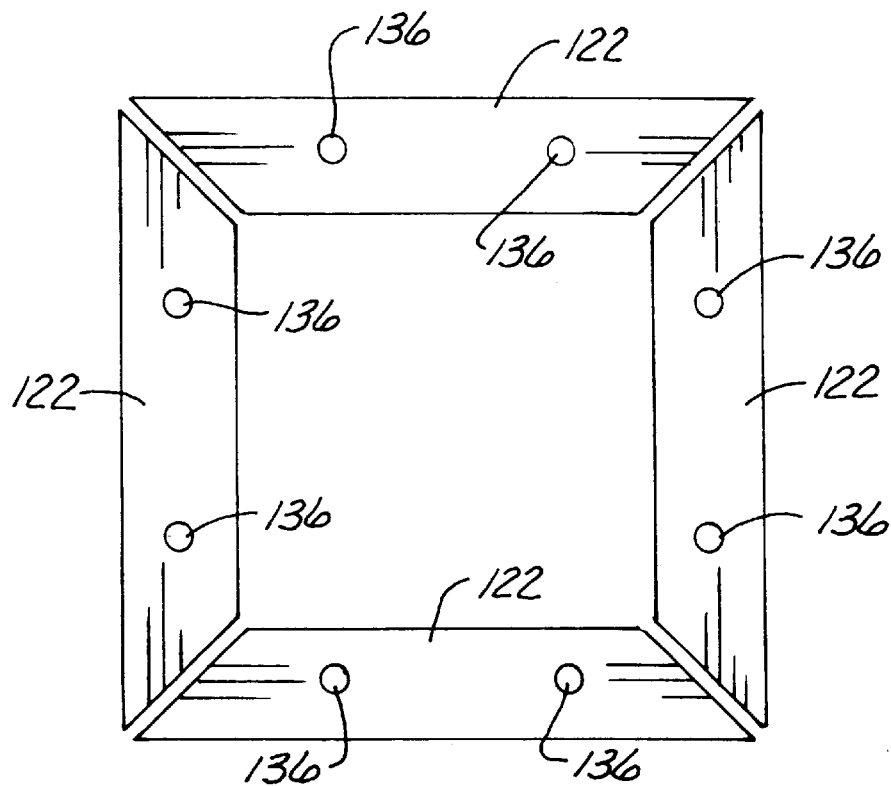
FIG. 17 is a top view of an alternate configuration of the die having openings for two alignment pins on each side, rather than only one per side, and having corner ventilation spaces for releasing heat therefrom.
Figure 18:
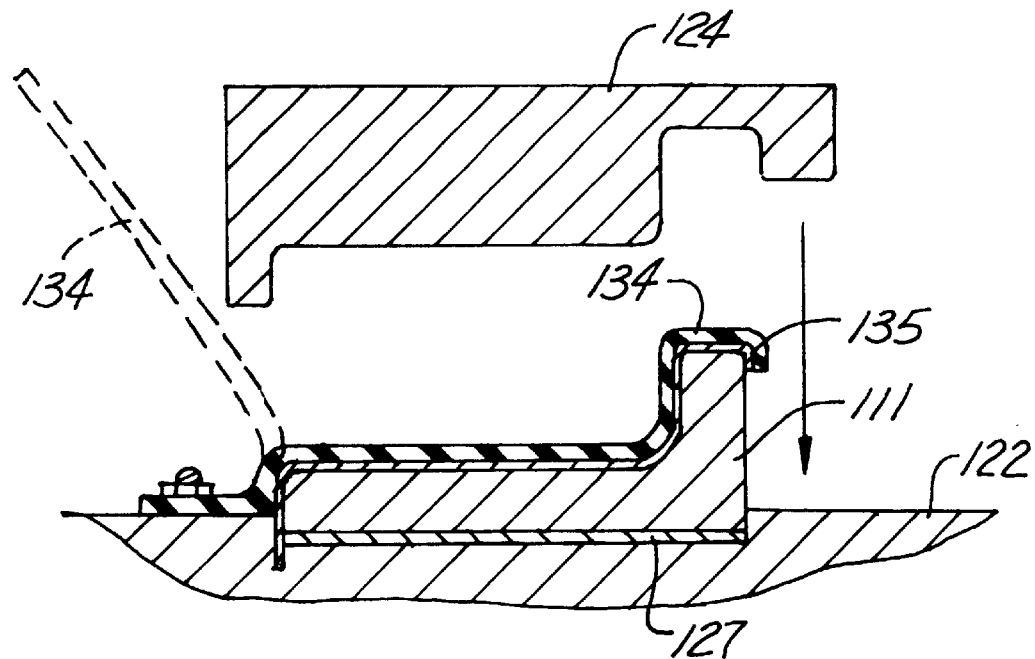
FIG. 18 shows an alternate view of how tiles of different shapes can be also laminated using the process of the present invention, the tile shape shown being a trim piece that goes around other sections of more standard shaped tile.

FIG. 17 shows an alternate die (122) with double bushings (136). This would require matching pins like pins (35) and bushings (136);

FIG. 18 shows an alternate substrate tile shape (111) for example, a trim piece of tile (111). Die (122) has a shim (127) and thermo foam sheet (134) so that when heated top caul plate (124) pushes on the foam (134), it compresses, heats and bonds layer (135), like those in FIG. 2, to the tile (111).

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A method of laminating a graphic sheet of material onto a substrate material, said method comprising:

positioning a substrate material, having a top and sides, into a desired position;

disposing (a) at least one sheet of thermo-setting adhesive on the top of said substrate material;

disposing (b) at least one opaque white melamine sheet on said at least one adhesive sheet;

disposing said (c) graphic sheet of material on said at least one opaque white melamine sheet;

disposing (d) at least one clear sheet of melamine on said graphic sheet of material;

disposing (e) at least one release paper sheet on said at least one clear sheet of melamine;

applying heat to said sheets sufficient to at least partially melt (a) the at least one sheet of thermo-setting adhesive, (b) the at least one opaque white melamine sheet, (d) the at least one clear sheet of melamine; and applying pressure sufficient to force said sheets (a) the at least one sheet of thermo-setting adhesive, (b) the at least one opaque white melamine sheet, (c) the graphic sheet of material, (d) the at least one clear sheet of melamine and (e) the at least one release paper sheet, together and against said substrate to thereby cause (1) bonding of said thermo-setting adhesive to the substrate and (2) to cause (b) the at least one opaque white melamine sheet, (c) the graphic sheet of material and (d) the at least one clear sheet of melamine to be cross-linked together.

2. The method of claim 1 wherein said sheets (a) the at least one sheet of thermo-setting adhesive, (b) the at least one opaque white melamine sheet, (c) the graphic sheet of material, (d) the at least one clear sheet of melamine and (e) the at least one release paper sheet are pressed over at least a portion of at least one side of said substrate material for causing the sheets (a) the at least one sheet of thermo-setting adhesive, (b) the at least one opaque white melamine, sheet, (c) the graphic sheet of material and (d) the at least one clear sheet of melamine to bond to said at least one portion of at least one side of the substrate material.

3. The method of claim 1 wherein said sheets (a) the at least one sheet of thermo-setting adhesive, (b) the at least one opaque white melamine sheet, (c) the graphic sheet of material, (d) the at least one clear sheet of melamine and (e) the at least one release paper sheet are pressed over at least portions of the sides of said substrate material for causing the sheets (b) the at least one opaque white melamine sheet, (c) the graphic sheet of material and (d) the at least one clear sheet of melamine to bond to said portions of the sides of the substrate material.

4. The method of claim 1 wherein the substrate material used is a ceramic tile.

5. The method of claim 1 including using said (e) sheet of release paper which is textured so that a finished laminated product has a predetermined texture on it.

6. The method of claim 1 including printing a design on said graphic sheet.

7. The method of claim 1 including printing a desired graphic design on said graphic sheet of paper.

8. The method of claim 1 including printing a desired graphic design on said graphic sheet of paper using an ink jet printer.

9. The method of claim 1 wherein said sheets (b) the at least one opaque white melamine sheet and (d) the at least one clear sheet of melamine bond by cross linking through the (c) graphic sheet of material whereby the graphic sheet of material does not substantially lose the whiteness it had prior to said cross linking.

10. The method of claim 1 wherein the graphic sheet of material is 20 LB ink jet paper.

11. The method of claim 1 wherein the graphic sheet of material does not contain substantial amounts of melamine.

12. An article of manufacture prepared by a process comprising:

positioning a substrate material, having a top and sides, into a desired position;

disposing (a) at least one sheet of thermo-setting adhesive on the top of said substrate material;

disposing (b) at least one opaque white melamine-sheet on said at least one adhesive sheet;

disposing a (c) graphic sheet of material on said at least one opaque white melamine. sheet;

disposing (d) at least one clear sheet of melamine on said graphic sheet of material;

disposing (e) at least one release paper sheet on said at least one clear sheet of melamine;

applying heat to said sheets sufficient to at least partially melt (a) the at least one sheet of thermo-setting adhesive, (b) the at least one opaque white melamine sheet, (d) the at least one clear sheet of melamine; and applying pressure sufficient to force said sheets (a) the at least one sheet of thermo-setting adhesive, (b) the at least one opaque white melamine sheet, (c) the graphic sheet of material, (d) the at least one clear sheet of melamine and (e) the at least one release paper sheet, together and against said substrate to thereby cause (1) bonding of said thermo-setting adhesive to the substrate and (2) to cause (b) the at least one opaque white melamine sheet, (c) the graphic sheet of material and (d) the at least one clear sheet of melamine to be cross-linked together.

13. The article of manufacture of claim 12 wherein said sheets (a) the at least one sheet of thermo-setting adhesive, (b) the at least one opaque white melamine sheet, (c) the graphic sheet of material, (d) the at least one clear sheet of melamine and (e) the at least one release paper sheet are pressed over at least a portion of at least one side of said substrate material for causing the sheets (a) the at least one sheet of thermosetting adhesive, (b) the at least one opaque white melamine sheet, (c) the graphic sheet of material and (d) the at least one clear sheet of melamine to bond to said at least one portion of at least one side of the substrate material.

14. The article of manufacture of claim 12 wherein said sheets (a) the at least one sheet of thermo-setting adhesive, (b) the at least one opaque white melamine sheet, (c) the graphic sheet of material, (d) the at least one clear sheet of melamine and (e) the at least one release paper sheet are pressed over at least portions of the sides of said substrate material for causing the sheets (b) the at least one opaque white melamine sheet, (c) the graphic sheet of material and (d) the at least one clear sheet of melamine to bond to said portions of the sides of the substrate material.

15. The article of manufacture of claim 12 wherein the substrate material used is a ceramic tile.

16. The article of manufacture of claim 12 including using said (e) sheet of release paper which is textured so that a finished laminated product has a predetermined texture on it.

17. The article of manufacture of claim 12 including printing a design on said graphic sheet.

18. The article of manufacture of claim 12 including printing a desired graphic design on said graphic sheet of paper.

19. The article of manufacture of claim 9 wherein said sheets (b) the at least one opaque white melamine sheet and (d) the at least one clear sheet of melamine bond by cross linking through the (c) graphic sheet of material whereby the graphic sheet of material does not substantially lose the whiteness it had prior to said cross linking.

20. The article of manufacture of claim 9 wherein the graphic sheet of material is 20 LB ink jet paper.

21. The article of manufacture of claim 9 wherein the graphic sheet of material does not contain substantial amounts of melamine.

\* \* \* \* \*